Patented June 6, 1950

2,510,724

UNITED STATES PATENT OFFICE 2,510,724

GERMICIDAL COMPOSITION COMPRISING A 3,5-DIMETHYL-4-NITROSOPYRAZOLE

Norman K. Sundholm, Naugatuck, Conn., assignor to United States Rubber Company, New York, N. Y., a corporation of New Jersey No Drawing. Application February 12, 1947, Serial No. 728,192

10 Claims. (Cl. 167—33)

This invention relates to new and useful improvements in germicides, that is, fungicides and bactericides. The invention further relates to methods of treating plants, and to methods of protecting organic material subject to attack by microorganisms, as the immunizing of seed, and the mildewproofing of fabrics and other material.

I have found that 4-nitrosopyrazoles are effective fungicides and bactericides. The structure of the parent compound, 4-nitrosopyrazole, may be represented as follows:

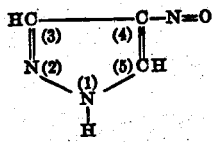

Two methods for the preparation of 4-nitrosopyrazoles are well known. Certain pyrazoles in which the 4-position is substituted with hydrogen can be nitrosated directly by treatment with nitrous acid or nitrous anhydride. Another method of preparation of 4-nitrosopyrazoles is by the reaction of an isonitroso beta dicarbonyl compound

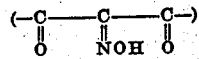

with hydrazine or a monosubstituted hydrazine, usually in acid medium. The isonitroso beta dicarbonyl compound may readily be prepared in known manner by treating the dicarbonyl compound

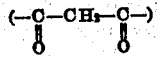

with nitrous acid or with a nitrous acid ester and alkali. Because acetylacetone is the most readily available beta-diketone and as monoarylhydrazines such as phenylhydrazine and p-chlorophenylhydrazine are easily prepared, these materials are of particular value in the preparation of the compounds of this invention.

Also, the 1-aryl-3,5-dimethyl-4-nitrosopyrazoles prepared from these materials exhibit exceptional fungicidal activity. The hydrogens in the 1, 3, and 5-positions of the parent 4-nitrosopyrazole may be substituted by univalent radicals, such as alkyl, cycloalkyl, aryl, and aralkyl radicals, and the hydrogen in the 5-position may be substituted also by alkoxy and secondary amino radicals to give various 4-nitrosopyrazoles which have been found as a class to be effective fungicides and bactericides.

The 4-nitrosopyrazoles may be used as seed protectants and disinfectants, and to protect plants, which term includes plant parts, or soil from microorganisms harmful to seeds and plants. They may also be applied to prevent or retard fungus growth and the formation of mildew on organic material, such as wood, fur, rope, hair, feathers, cotton, wool, synthetic organic fibers, and the like. They may be applied as a dust, as in admixture with a solid carrier, such as clay or talc, or they may be applied as a liquid or spray in a liquid carrier, as in solution in a suitable solvent, or suspended in a suitable non-solvent, for example, water. Preferably when applied in aqueous suspension, the composition contains a dispersing agent for the chemical. In seed treatment, the 4-nitrosopyrazoles are preferably applied to the seed, as by tumbling with the chemical alone or admixed with a powdered solid carrier. In foliage treatment, the 4-nitrosopyrazoles are preferably applied to the plant parts by spraying with an aqueous suspension of the chemical containing a dispersing agent. The chemicals may be applied to foliage by the aerosol method. Solutions for the aerosol treatment may be prepared by dissolving the chemical directly in the highly volatile liquid carrier or first dissolving the chemical in a less volatile solvent and then admixing such solution with the highly volatile liquid aerosol carrier. The 4-nitrosopyrazoles may be used admixed with carriers that are active of themselves, for example, other fungicides or bactericides, insecticides, insectifuges, fertilizers, hormones.

Examples of 4-nitrosopyrazoles, which are new compounds, and their preparation, are as follows:

1-(4-chlorophenyl)-3,5-dimethyl-4-nitrosopyrazole

A suspension of 5 g. of acetylacetone in a mixture of 50 cc. of water and 4.5 cc. of concentrated hydrochloric acid was cooled in an ice bath to below 5° C. While the suspension was stirred a cold solution of 3.5 g. of sodium nitrite in 20 cc. of water was added slowly. While this latter reaction was proceeding, 7.1 g. of p-chlorophenylhydrazine was added to a mixture of 700 cc. of water and 25 cc. of concentrated hydrochloric acid. The mixture was warmed until the p-chlorophenylhydrazine had dissolved. It was then cooled in ice. The solution of the isonitrosoacetylacetone prepared above was added slowly to it with stirring. The green solid which separated was filtered off and dried; the yield was 4 g. The product melted at 118° C. Anal. calculated for $C_{11}H_{10}ClN_3O$: N, 17.84; Found: N, 17.70, 17.56.

The 3,5-dimethyl-4-nitrosopyrazoles below were similarly prepared from isonitrosoacetylacetone and the required hydrazine.

1-(4-nitrophenyl)-3,5-dimethyl-4-nitrosopyrazole

This compound was prepared from p-nitrophenylhydrazine and isonitrosoacetylacetone. The product was recrystallized from alcohol to give green crystals, M. P. 134° C. Anal. calculated for $C_{11}H_{10}N_4O_3$: N, 22.76; Found: N, 22.23.

1-(α-napthyl)-3,5-dimethyl-4-nitrosopyrazole

This compound was prepared from α-naphthylhydrazine and isonitrosoacetylacetone; green crystals from alcohol, M. P. 88–89° C. Anal. calculated for $C_{15}H_{13}N_3O$: N, 16.73; Found: N, 16.57.

1-(2,4-dichlorophenyl)-3,5-dimethyl-4-nitrosopyrazole

This compound was prepared from 2,4-dichlorophenylhydrazine and isonitrosoacetylacetone; green crystals from alcohol, M. P. 89–90° C. Anal. calculated for $C_{11}H_9Cl_2N_3O$: N, 15.57; Found: N, 15.64, 15.48.

1-(2,5-dichlorophenyl)-3,5-dimethyl-4-nitrosopyrazole

This compound was prepared from 2,5-dichlorophenylhydrazine and isonitrosoacetylacetone; green crystals from alcohol, M. P. 99–100° C. Anal. calculated for $C_{11}H_9Cl_2N_3O$: N, 15.57; Found: N, 15.26, 15.39.

1-(4-tert-amylphenyl)-3,5-dimethyl-4-nitrosopyrazole

This compound was prepared from p-tert-amylphenylhydrazine and isonitrosoacetylacetone; green crystals from alcohol, M. P. 92–93° C. Anal. calculated for $C_{16}H_{21}N_3O$: N, 15.5; Found: N, 15.4.

1-(4-carboxyphenyl)-3,5-dimethyl-4-nitrosopyrazole

This compound was prepared from p-hydrazinobenzoic acid and isonitrosoacetylacetone. The product was recrystallized from alcohol to give a green-blue solid which does not melt below 220° C. However, above 120° C. the compound slowly turns brown. Anal. calculated for $C_{12}H_{11}N_3O_3$ N, 17.14; Found: N, 16.95.

The copper salt (of 1-(4-carboxyphenyl)-3,5-dimethyl-4-nitrosopyrazole was prepared by adding a solution of ½ mol of cupric sulfate to a solution of 1 mol of the sodium salt of the acid. The brown precipitate was filtered off and dried.

1-(4-thiocyanophenyl)-3,5-dimethyl-4-nitrosopyrazole

This compound was prepared from p-thiocyanophenylhydrazine and isonitrosoacetylacetone; green crystals from alcohol, M. P. 105° C. Anal. calculated for $C_{12}H_{10}N_4OS$: N, 21.71; S, 12.40; Found: N, 22.20; S, 12.82.

1-(4-sulfamylphenyl)-3,5-dimethyl-4-nitrosopyrazole

This compound was prepared from 4-hydrazinobenzenesulfonamide and isonitrosoacetylacetone; green crystals from alcohol, decomposes at 198° C. Anal. calculated for $C_{11}H_{12}N_4O_3S$: S, 11.4; Found: S, 11.7.

1-(m-chlorophenyl)-3,5-dimethyl-4-nitrosopyrazole

This compound was prepared from m-chlorophenylhydrazine and isonitrosoacetylacetone; light green crystals from alcohol, M. P. 84° C. Anal. calculated for $C_{11}H_{10}ClN_3O$: Cl, 15.1; Found: Cl, 15.3.

1-(o-chlorophenyl)-3,5-dimethyl-4-nitrosopyrazole

This compound was prepared from o-chlorophenylhydrazine and isonitrosoacetylacetone; blue crystals from alcohol, M. P. 117° C. Anal. calculated for $C_{11}H_{10}ClN_3O$: Cl, 15.07; Found: Cl, 15.20.

1-(4-iodophenyl)-3,5-dimethyl-4-nitrosopyrazole

This compound was prepared from p-iodophenylhydrazine and isonitrosoacetylacetone; green crystals from alcohol, M. P. 112° C. Anal. calculated for $C_{11}H_{10}IN_3O$: N, 12.84; Found: N, 12.61.

1-(4-fluorophenyl)-3,5-dimethyl-4-nitrosopyrazole

This compound was prepared from p-fluorophenylhydrazine and isonitrosoacetylacetone; blue-green crystals, M. P. 116–117° C. Anal. calculated for $C_{11}H_{10}FN_3O$: N, 19.18; Found: N, 18.91.

1-(p-xenyl)-3,5-dimethyl-4-nitrosopyrazole

This compound was prepared from 4-hydrazinobiphenyl and isonitrosoacetylacetone; green crystals from alcohol, M. P. 165° C. Anal. calculated for $C_{17}H_{15}N_3O$: N, 15.17; Found: N, 15.26.

1-(m-tolyl)-3,5-dimethyl-4-nitrosopyrazole

This compound was prepared from m-tolylhydrazine and isonitrosoacetylacetone. The product is a brown-green oil.

1-(4-n-butylphenyl)-3,5-dimethyl-4-nitrosopyrazole

This compound was prepared from 4-n-butylphenylhydrazine and isonitrosoacetylacetone. The product is a dark green oil.

1-(4-chlorophenyl)-3-methyl-4-nitroso-5-n-hexylpyrazole

Heptanoylacetone was prepared by treating a mixture of ethyl acetate and methyl n-hexyl ketone with sodium. The heptanoylacetone distilled at 103–108° C./11 mm. A solution of 8.65 g. of sodium nitrite in 25 cc. of water was added slowly to a stirred solution of 21 g. of heptanoylacetone in 60 cc. of acetic acid kept at 15° C. After stirring for a half hour, this solution was added slowly to a solution of 17.5 g. of p-chlorophenylhydrazine in a mixture of 10.5 cc. of concentrated hydrochloric acid and 500 cc. of water. A blue oil was produced. The blue oil was separated from the aqueous layer by extraction with ether. The ether solution was dried with anhydrous sodium sulfate and the ether removed by distillation. A dark green oil remained. It weighed 26 g.

1,3,5-trimethyl-4-nitrosopyrazole

A solution of 4.9 g. of sodium nitrite in 20 cc. of water was added to a cold stirred mixture of 7 g. of acetylacetone, 6 cc. of concentrated hydrochloric acid and 70 cc. of water. The resulting solution was slowly added to a solution of 7.4 g. of sodium carbonate and 10.1 g. of methylhydrazine sulfate in 100 cc. of water cooled to 5° C. The mixture was stirred in ice for two hours, the blue solid product filtered off and the product dried. It melted at 80–81° C. Anal. calculated for $C_6H_9N_3O$; N, 30.2; Found: N, 29.1.

Literature references to the preparation of various 4-nitrosopyrazoles which are old compounds, and on which germicidal tests are reported in the tables below, are as follows:

1-(bromophenyl)-3,5-dimethyl-4-nitrosopyrazole (see Sachs and Alsleben, Ber. 40, 669), M. P. 123° C.

1-phenyl-3,5-dimethyl-4-nitrosopyrazole (see Wolff, Annalen, 325, 192), M. P. 94° C.

3,5-dimethyl-4-nitrosopyrazole (see Wolff, Annalen, 325, 193), M. P. 128° C.

3-methyl-4-nitroso-5-phenylpyrazole (see Sachs and Alsleben, Ber. 40, 672), M. P. 152° C.

1-carbamyl-3,5-dimethyl-4-nitrosopyrazole (see Sachs and Alsleben, Ber. 40, 671), M. P. 130° C.

1-(p-tolyl)-3,5-dimethyl-4-nitrosopyrazole (see Sachs and Alsleben, Ber. 40, 670), M. P. 112–114° C.

3-methyl-4-nitroso-5-ethoxypyrazole (see Wolff, Ber. 37, 2835), M. P. 126–127° C.

1-phenyl-3-methyl-4-nitroso-5-methylanilinopyrazole (also called 4-nitrosopseudoanilinopyrin) (see Michaelis and Mielecke, Ber. 40, 4482).

The following examples of the effectiveness of the various 4-nitrosopyrazoles as fungicides and bactericides are given to illustrate the invention (all percentages and parts are by weight):

Example I

Various 4-nitrosopyrazoles prepared as above in aqueous suspensions at dosages of 405 parts per million were sprayed on various tomato plants. The suspensions were prepared with small amounts of a commercial surface-active dispersing agent (Emulphor EL which is a reaction product of ethylene oxide and castor oil) which was known to be non-toxic to the organisms under test. When the thus treated plants were sufficiently dry, the plants, together with untreated (check) plants, were uniformly inoculated by spraying onto the foliage an aqueous suspension of spores of Alternaria solani, the fungus responsible for a serious leaf blight disease of this crop. The plants were placed in an inoculation chamber at 75° F. and 99% humidity for 20 hours, after which they were removed to normal greenhouse conditions. After two days in the greenhouse, the effectiveness of the various 4-nitrosopyrazoles was determined by counting the blight lesions on the tomato plants treated with the various 4-nitrosopyrazoles, and comparing with the number of blight lesions on the check plants which were not treated with the chemicals. The number of blight lesions on the plants treated with the various 4-nitrosopyrazoles and the number of blight lesions on the check plants are shown in columns 1 and 2 of the following table. The percent control by the various 4-nitrosopyrazoles is shown in the third column of the following table:

| Treatment Chemical | Blight Lesions per Plant | | Control |
| --- | --- | --- | --- |
| | Treated Plants | Check Plants | |
| | | | Per cent |
| 1-Phenyl-3,5-dimethyl-4-nitrosopyrazole | 0 | 379 | 100 |
| 1-(p-Tolyl)-3,5-dimethyl-4-nitrosopyrazole | 0 | 379 | 100 |
| 1-(4-Chlorophenyl)-3,5-dimethyl-4-nitrosopyrazole | 0 | 379 | 100 |
| 1,3,5-Trimethyl-4-nitrosopyrazole | 132 | 379 | 65 |
| 1-(4-Chlorophenyl)-3-methyl-4-nitroso-5-n-hexylpyrazole | 47 | 379 | 87.5 |
| 1-(4-Bromophenyl)-3,5-dimethyl-4-nitrosopyrazole | 0 | 379 | 100 |
| 1-(4-tert-Amylphenyl)-3,5-dimethyl-4-nitrosopyrazole | 0 | 379 | 100 |
| 1-(2,4-Dichlorophenyl)-3,5-dimethyl-4-nitrosopyrazole | 3 | 276 | 99 |
| 1-(2,5-Dichlorophenyl)-3,5-dimethyl-4-nitrosopyrazole | 0 | 276 | 100 |
| 3-Methyl-4-nitroso-5-phenylpyrazole | 31 | 200 | 84.5 |
| 3,5-Dimethyl-4-nitrosopyrazole | 89 | 195 | 54.5 |
| 1-Carbamyl-3,5-dimethyl-4-nitrosopyrazole | 124 | 399 | 69 |
| 1-(4-Carboxyphenyl)-3,5-dimethyl-4-nitrosopyrazole | 24 | 291 | 92 |
| Copper salt of 1-(4-carboxyphenyl)-3,5-dimethyl-4-nitrosopyrazole | 19 | 291 | 93.5 |
| 3-Methyl-4-nitroso-5-ethoxypyrazole | 91 | 291 | 69 |
| 1-(α-Naphthyl)-3,5-dimethyl-4-nitrosopyrazole | 0 | 3.0 | 100 |
| 1-(4-Nitrophenyl)-3,5-dimethyl-4-nitrosopyrazole | 6 | 410 | 98.5 |
| 1-(4-Thiocyanophenyl)-3,5-dimethyl-4-nitrosopyrazole | 2 | 252 | 99 |
| 1-(4-Sulfamylphenyl)-3,5-dimethyl-4-nitrosopyrazole | 5 | 252 | 98 |
| 1-(m-Chlorophenyl)-3,5-dimethyl-4-nitrosopyrazole | 0 | 252 | 100 |
| 1-(o-Chlorophenyl)-3,5-dimethyl-4-nitrosopyrazole | 0 | 252 | 100 |
| 1-(4-Iodophenyl)-3,5-dimethyl-4-nitrosopyrazole | 10 | 575 | 98 |
| 1-(4-Fluorophenyl)-3,5-dimethyl-4-nitrosopyrazole | 5 | 259 | 98 |
| 1-(p-Xenyl)-3,5-dimethyl-4-nitrosopyrazole | 78 | 252 | 69 |
| 1-(4-n-Butylphenyl)-3,5-dimethyl-4-nitrosopyrazole | 64 | 445 | 85 |
| 1-Phenyl-3-methyl-4-nitroso-5-methylanilinopyrazole | 0 | 265 | 100 |

Example II

Pea seeds variety Laxton's Progress were tumbled with different dosages (.16% and .64% of seed weight) of various 4-nitrosopyrazoles in finely ground form. The seeds were planted in wet compost soil in flats which were kept in a moisture chamber at 60° F. and 99% humidity for six days. The flats were then placed in the greenhouse and kept there until the plants were 3 to 4 inches high. The fungicidal effectiveness of these 4-nitrosopyrazoles was determined by comparing the percentage of treated seeds with the percentage of untreated (check) seeds which germinated and developed into healthy plants. The results are shown in the following table:

| Chemical | Per Cent Germination, Dosage of— | |
|---|---|---|
| | .64% | .16% |
| 1-(4-Chlorophenyl)-3,5-dimethyl-4-nitrosopyrazole | 66.0 | 54.4 |
| 1-Phenyl-3,5-dimethyl-4-nitrosopyrazole | 75.6 | 58.4 |
| 1-(4-tert-Amylphenyl)-3,5-dimethyl-4-nitrosopyrazole | 47.2 | 45.2 |
| 1-(4-Bromophenyl)-3,5-dimethyl-4-nitrosopyrazole | 61.6 | 63.2 |
| 1-(p-Tolyl)-3,5-dimethyl-4-nitrosopyrazole | 64.4 | 61.2 |
| 1-(2,4-Dichlorophenyl)-3,5-dimethyl-4-nitrosopyrazole | 61.2 | 49.2 |
| Untreated (check) | 33.6% to 37.6% | |

Example III

Five strips of cotton duck, 1" x 6", were soaked in a 1% solution of 1-(4-chlorophenyl)-3,5-dimethyl-4-nitrosopyrazole in acetone; similar strips were simultaneously soaked in acetone. After all strips were completely saturated they were removed from the baths, dried, and buried in compost soil. After five weeks the strips were removed from the soil. The strips which had been treated with the 4-nitrosopyrazole had tensile strengths of 138, 122, 127, 124, and 125 pounds per inch. The control strips were almost completely rotted and had no tensile strength.

Example IV

The following table lists the percent germination of *Alternaria solani* and *Sclerotinia americana* fungus spores on glass slides when treated with various of the 4-nitrosopyrazoles at 100, 10 and 1 parts per million (P. P. M.). The procedure used is that outlined in Phytopathology 33, 627 (1943).

| Chemical | Percent Germination at— | | |
|---|---|---|---|
| | 100 P.P.M. | 10 P.P.M. | 1 P.P.M. |
| 1-Phenyl-3,5-dimethyl-4-nitrosopyrazole | 0 | 0 | 0 |
| 1-(p-Tolyl)-3,5-dimethyl-4-nitrosopyrazole | 0 | 0 | 0 |
| 1-(4-Chlorophenyl)-3,5-dimethyl-4-nitrosopyrazole | 0 | 0 | 0 |
| 1,3,5-Trimethyl-4-nitrosopyrazole | 0 | 0 | 0 |
| 1-(4-Chlorophenyl)-3-methyl-4-nitroso-5-n-hexylpyrazole | 0 | 0 | 0 |
| 1-(4-Bromophenyl)-3,5-dimethyl-4-nitrosopyrazole | 0 | 0 | 0 |
| 1-(4-tert-Amylphenyl)-3,5-dimethyl-4-nitrosopyrazole | 0 | 0 | 0 |
| 1-(2,4-Dichlorophenyl)-3,5-dimethyl-4-nitrosopyrazole | 0 | 0 | 0 |
| 1-(2,5-Dichlorophenyl)-3,5-dimethyl-4-nitrosopyrazole | 0 | 0 | 0 |
| 3-Methyl-4-nitroso-5-phenylpyrazole | 0 | 0 | Alt. 65 Scl. 0 |
| 3,5-Dimethyl-4-nitrosopyrazole | 0 | Alt. 91 Scl. 80 | |
| 1-Carbamyl-3,5-dimethyl-4-nitrosopyrazole | 0 | Alt. 90 Scl. 97 | |
| 1-(4-Carboxyphenyl)-3,5-dimethyl-4-nitrosopyrazole | 0 | | Alt. 75 Scl. 67 |
| 1-(4-Nitrophenyl)-3,5-dimethyl-4-nitrosopyrazole | 0 | 0 | 0 |
| 1-(α-Naphthyl)-3,5-dimethyl-4-nitrosopyrazole | 0 | 0 | 0 |
| Copper salt of 1-(4-carboxyphenyl)-3,5-dimethyl-4-nitrosopyrazole | | Alt. 95 Scl. 90 | |
| 1-(4-Thiocyanophenyl)-3,5-dimethyl-4-nitrosopyrazole | 0 | 0 | 0 |
| 1-(4-Sulfamylphenyl)-3,5-dimethyl-4-nitrosopyrazole | 0 | Alt. 88 Scl. 90 | Alt. 93 Scl. 96 |
| 1-(m-Chlorophenyl)-3,5-dimethyl-4-nitrosopyrazole | 0 | 0 | 0 |
| 1-(o-Chlorophenyl)-3,5-dimethyl-4-nitrosopyrazole | 0 | 0 | 0 |
| 1-(4-Iodophenyl)-3,5-dimethyl-4-nitrosopyrazole | 0 | 0 | 0 |
| 1-(4-Fluorophenyl)-3,5-dimethyl-4-nitrosopyrazole | | 0 | 0 |
| 1-(p-Xenyl)-3,5-dimethyl-4-nitrosopyrazole | Alt. 0 Scl. 93 | Alt. 0 Scl. 100 | Alt. 39 Scl. 100 |
| 1-(m-Tolyl)-3,5-dimethyl-4-nitrosopyrazole | 0 | 0 | 0 |
| 1-(4-n-Butylphenyl)-3,5-dimethyl-4-nitrosopyrazole | 0 | 0 | Alt. 85 Scl. 91 |
| 1-Phenyl-3-methyl-4-nitroso-5-methyl-anilinopyrazole | 0 | 0 | 0 |

Example V

The 4-nitrosopyrazoles have been shown to be bactericides by their ability to control *Phytomonas tumefaciens*, the casual agent of crown gall disease of apples, roses and many other plants.

One cc. aliquots of a culture of *Phytomonas tumefaciens* were dispersed in 9 cc. of sterile nutrient-dextrose broth and 1.1 cc. of chemical suspension added to give concentrations of the 4-nitrosopyrazoles of 1.6, 8.0, 40.0 and 200.0 P. P. M. Triplicate cultures containing each of the test chemicals were incubated sixteen hours at 27° C. During this period, tubes containing bacteria without test chemical became very turbid, indicating that the bacteria were capable of growth. The following table gives the lowest concentration of the chemical suspension added which prevented visible bacterial growth:

| Chemical | Concentration of Chemical Preventing *P. tumefaciens* Growth |
|---|---|
| | P.P.M. |
| 1-(4-Chlorophenyl)-3,5-dimethyl-4-nitrosopyrazole | 8.0 |
| 1-Phenyl-3,5-dimethyl-4-nitrosopyrazole | 1.6 |
| 3,5-Dimethyl-4-nitrosopyrazole | 8.0 |
| 1-(2,4-Dichlorophenyl)-3,5-dimethyl-4-nitrosopyrazole | 8.0 |
| 1,3,5-Trimethyl-4-nitrosopyrazole | 40.0 |
| 1-(4-Bromophenyl)-3,5-dimethyl-4-nitrosopyrazole | 40.0 |

The 4-nitrosopyrazoles have been further shown to be bactericides by their ability to control *Xanthomonas phaseoli*, the bacterium that causes common bacterial blight of beans. An actively growing 17-hour culture of bacteria in broth was suspended in warm nutrient-dextrose agar immediately before pouring about 20 cc. in each of several petri dishes 9 cm. in diameter. The bacterial cells grew readily in this medium as shown by uniform growth in all untreated dishes after 48 hours at 27° C.

The bactericidal-bacteriostatic action of the 4-nitrosopyrazoles was assayed by dipping sterile filter paper discs 13 mm. in diameter in aqueous suspensions of the chemical containing 2000, 400, 80 and 16 P. P. M. of the chemical and small amounts of Emulphor EL, and transferring the discs impregnated with chemical to the center of the dishes immediately after the agar hardened. The chemical diffused into the agar and those that were active prevented multiplication of the bacterial cells for considerable distance. Data on the average diameter of the clear zones for the discs treated with the 4-nitrosopyrazoles, and for the check discs, which were treated with an Emulphor EL solution in the absence of 4-nitrosopyrazoles, are shown in the table below:

| Chemical | Diameter of Clear Zone for Chemical at Concentration of— | | | |
|---|---|---|---|---|
| | 2000 P.P.M. | 400 P.P.M. | 80 P.P.M. | 16 P.P.M. |
| | Mm. | Mm. | Mm. | Mm. |
| 1-Phenyl-3,5-dimethyl-4-nitrosopyrazole | 62 | 42 | 32 | 22 |
| 1,3,5-Trimethyl-4-nitrosopyrazole | 90 | 80 | 65 | 29 |
| 1-(4-Bromophenyl)-3,5-dimethyl-4-nitrosopyrazole | 90 | 30 | 22 | 0 |
| 1-(4-Carboxyphenyl)-3,5-dimethyl-4-nitrosopyrazole | 39 | 31 | 24 | 17 |
| 3,5-Dimethyl-4-nitrosopyrazole | 90 | | | 20 |
| Check discs | 0 | 0 | | |

Example VII

In order to make a comparison with known germicides, a test was made with mercuric chloride, phenol and 1,3,5-trimethyl-4-nitrosopyrazole against *Phytomonas tumefaciens*. The procedure was similar to that outlined in Example VI except that the sterile discs were 9 mm. in diameter and the chemicals were suspended in water at concentrations of 2000, 200, 20, 2 and 0.2 P. P. M. Data on the diameter of the clear zones is given in the following table, which shows the relative ability of 1,3,5-trimethyl-4-nitrosopyrazole, mercuric chloride and phenol to prevent growth of *Phytomonas tumefaciens* in agar.

| Chemical Tested | Concentration | Diameter of Clear Zone of Inhibition |
|---|---|---|
| | P.P.m. | Mm. |
| Mercuric Chloride | 2,000 | 28 |
| | 200 | 17 |
| | 20 | 14 |
| | 2 | 0 |
| 1,3,5-Trimethyl-4-nitrosopyrazole | 2,000 | 80 |
| | 200 | 65 |
| | 20 | 32 |
| | 2 | 6 |
| | 0.2 | 0 |
| Phenol | 2,000 | 20 |
| | 200 | 10 |
| | 20 | 8 |
| | 2 | 5 |
| | 0.2 | 0 |
| Check discs | | 0 |

The 4-nitrosopyrazole was superior to both bichloride of mercury and phenol. The zone of inhibition at 20 P. P. M. for the 4-nitrosopyrazole was larger than that for the standard bactericides at 2000 P. P. M.

Having thus described my invention, what I claim and desire to protect by Letters Patent is:

1. A fungicidal composition comprising an aqueous suspension of a 3,5-dimethyl-4-nitrosopyrazole in which the 1-nitrogen of the pyrazole nucleus is attached to a member of the group consisting of hydrogen, alkyl, aryl and aralkyl radicals, said aqueous suspension containing a dispersing agent.

2. A fungicidal composition comprising an aqueous suspension of a 1-aryl-3,5-dimethyl-4-nitrosopyrazole, said aqueous suspension containing a dispersing agent.

3. A fungicidal composition comprising an aqueous suspension of a 1-chlorophenyl-3,5-dimethyl-4-nitrosopyrazole, said aqueous suspension containing a dispersing agent.

4. As a new compound, a 1-chlorophenyl-3,5-dimethyl-4-nitrosopyrazole in which the chlorophenyl radical is selected from the group consisting of 4-chlorophenyl, m-chlorophenyl, o-chlorophenyl, 2,4-dichlorophenyl, and 2,5-dichlorophenyl radicals.

5. As a new compound, 1-(4-chlorophenyl)-3,5-dimethyl-4-nitrosopyrazole.

6. As a new compound, 1-(2,4-dichlorophenyl)-3,5-dimethyl-4-nitrosopyrazole.

7. As a new compound, 1-(2,5-dichlorophenyl)-3,5-dimethyl-4-nitrosopyrazole.

8. A fungicidal composition comprising an aqueous suspension of 1-(2,5-dichlorophenyl)-3,5-dimethyl-4-nitrosopyrazole, said aqueous suspension containing a dispersing agent.

9. A germicidal composition comprising a 3,5-dimethyl-4-nitrosopyrazole in which the 1-nitrogen of the pyrazole nucleus is attached to a member of the group consisting of hydrogen, alkyl, aryl and aralkyl radicals, said composition containing a surface-active dispersing agent.

10. A fungicidal composition comprising a 1-aryl-3,5-dimethyl-4-nitrosopyrazole and a surface-active dispersing agent.

NORMAN K. SUNDHOLM.

REFERENCES CITED

The following references are of record in the file of this patent:

UNITED STATES PATENTS

| Number | Name | Date |
|---|---|---|
| 2,392,326 | Kyrides | Jan. 8, 1946 |

OTHER REFERENCES

Beilstein, "Organische Chemie," vol. 23, pages 77 and 189.